(12) United States Patent
Temple

(10) Patent No.: US 6,715,714 B2
(45) Date of Patent: Apr. 6, 2004

(54) LANDING GEAR FOR MODEL AIRPLANE

(76) Inventor: Larry Dan Temple, 2000 Isabelle Ave., San Mateo, CA (US) 94403

( * ) Notice: Subject to any disclaimer, the term of this patent is extended or adjusted under 35 U.S.C. 154(b) by 0 days.

(21) Appl. No.: 09/962,475

(22) Filed: Sep. 24, 2001

(65) Prior Publication Data

US 2003/0057321 A1 Mar. 27, 2003

(51) Int. Cl.⁷ .............................................. B64C 25/62
(52) U.S. Cl. ........................... 244/104 CS; 244/104 R; 446/34
(58) Field of Search .................. 244/100 R, 104 R, 244/104 CS, 104 LS, 103 R; 446/34

(56) References Cited

U.S. PATENT DOCUMENTS

| | | | | |
|---|---|---|---|---|
| 2,342,339 A | * | 2/1944 | Hendrickson | 244/104 LS |
| 2,479,976 A | * | 8/1949 | Shultz | 152/342.1 |
| 5,129,596 A | | 7/1992 | Wagner | 244/104 |
| 5,573,204 A | * | 11/1996 | Barker et al. | 244/100 R |
| 6,183,331 B1 | | 2/2001 | Lai | 440/34 |

FOREIGN PATENT DOCUMENTS

CH 591361 * 9/1977 ........... B64C/25/18

* cited by examiner

Primary Examiner—Peter M. Poon
Assistant Examiner—Timothy D. Collins
(74) Attorney, Agent, or Firm—Robert Samuel Smith

(57) ABSTRACT

A landing gear for a model airplane featuring a support structure that is spring loaded to permit controlled resilient tilting of the support structure thereby absorbing the shear impulses to which a plane is is otherwise subject to. A pair of springs is mounted on the outside of the plane and supports the union section of a yoke with attached wheels against the plane body. Fasteners attaching landing gear to plane body provide sufficient range in two degrees of freedom to permit rearward/forward and sideways tilt of the landing gear.

9 Claims, 3 Drawing Sheets

LANDING GEAR FOR MODEL AIRPLANE

FIELD OF THE INVENTION

This invention relates to landing gears for model air planes and particularly to a landing gear that accommodates to the large impulsive torque to which the landing gear is subject when the model plane lands.

BACKGROUND AND INFORMATION DISCLOSURE

The landing gear of a model air plane is the supporting structure attached AT a lower level to wheels that are in contact with the RUNWAY (ground and, at an upper level, to the under surface of the airplane body. The most frequent occurrence of damage to a model airplane is the damage that the landing gear does to the airplane body when the plane lands. Damage with landing gears of the present art results from the horizontal shear that is developed as forward momentum of the plane is suddenly opposed by contact with the ground. In many instances, the landing gear is simply torn off the body.

The landing gear of the prior art includes simply a frame a pair of wheels that is bolted to the body.

U.S. Pat. No. 6,183,3331 to Lai discloses a landing gear seat (or channel), made of hard wooden or plastic material that straddles and abuts the central 'fixing member' (union) of a landing gear having an extension on each end supporting a wheel.

The object of the invention is to provide an assembly structure for landing gear of a model airplane in which the landing gear is fixed on a landing gear fixing seat by fixing pins passing through the fixing seat. The pins are captured inside the plane by a pair of spring loaded nuts. The construction stresses the advantage of quick assembly/ disassembly but does not claim any improvement over the existing art in resisting damage due to the destructive torques that lead to damage to the airplane body when the airplane encounters irregular terrain when landing. The springs, being on the inside of the airplane, only serve to maintain the landing gear in abutment with the plane body.

U.S. Pat. No. 5,129,596 to Wagener discloses a shock strut having a top end secured to the underside of the airplane body and the lower end mounted on a spring. The objective is to provide a design that ostensibly resembles a large plane.

SUMMARY OF THE INVENTION

It is an object of this invention to provide a landing gear for a model aircraft that is especially effective in resisting the shear forces generated when the landing gear of the air plane contacts the ground.

It is another object that the landing gear of this invention be mountable on surfaces of the aircraft that are normally horizontal (such as the under side).

It is another object that the landing gear be economical,

This invention is directed toward a landing gear including a support that is spring loaded so as to permit the support to rotate about a horizontal axis that is either parallel or perpendicular to the direction of travel when the wheels hit the ground. The support comprises a yoke including two legs, each having a wheel rotatably mounted on a lower end and a union section that joins the two upper ends of the legs. A The threaded ends of a pair of mounting bolts protrude through slot apertures in the union section and screw into blind nuts imbedded in the body of the airplane. A coil spring is mounted on each bolt and is partially compressed between a rubber washer against the head of the respective bolt and the union section of the support. Each spring and bolt therefore extend downward away from the bottom side of the union section and the body of the airplane. Therefore, the compressed spring forces the top surface of the union section directly against the underside of the airplane. The two slot apertures are aligned end to end and have a width that is slightly larger than the diameter of the bolt. The bolts are spaced from one another by a distance that equals the distance between the nuts in the body of the plane so that each bolt passes through one end of the respective slot closest to the end of the other slot.

The width of the slots is selected to allow the union section to tilt away from the surface of the airplane body by about 15°. For a union section made from 16 ga. sheet metal, the width of the slot will be about 0.030" wider than the diameter of the bolts.

This selection of slot position and dimension permits the yoke to rotate either in a forward or reverse direction or from a side to side direction in response to encountering uneven topography of the landing strip. This action is enabled by springs whose axes bend in response to the applied forces but which are sufficiently compressed to restore the landing gear to its stable orientation where the axis of each spring is straight.

In another embodiment, a rubber sponge pad is interposed in the interface between the plane body and the union section which increases the shock absorbing capability of the landing gear.

DESCRIPTION OF A BEST MODE

Figure 1:
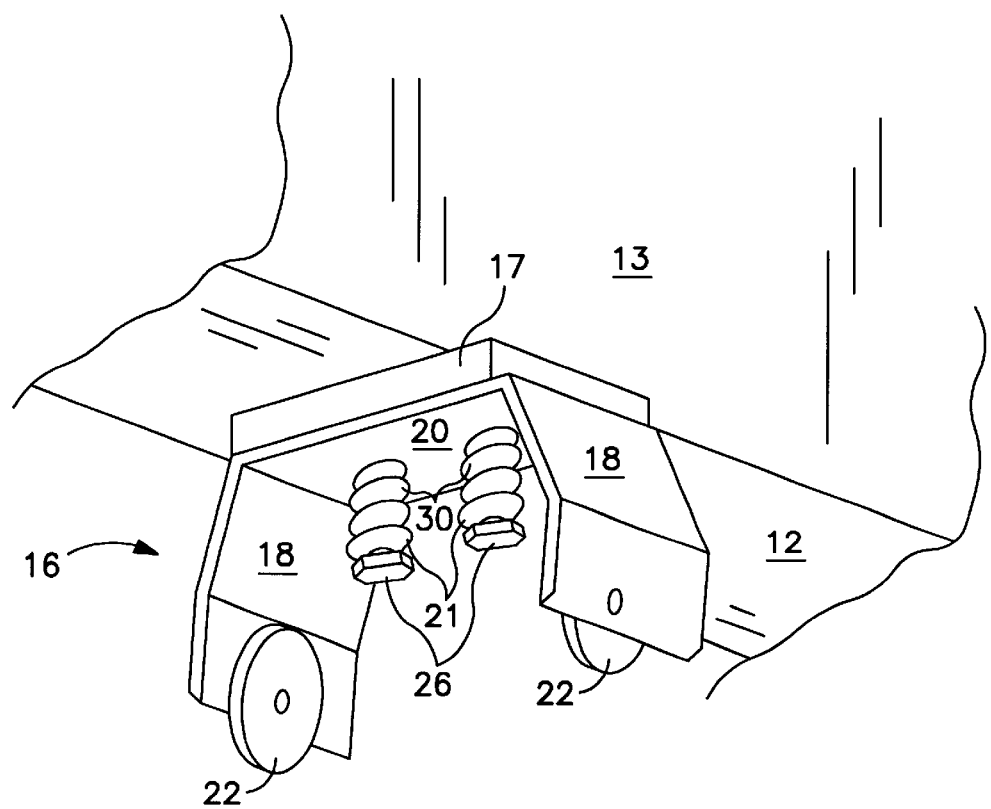
FIG. 1 shows an assembly view of the invention
Figure 2:
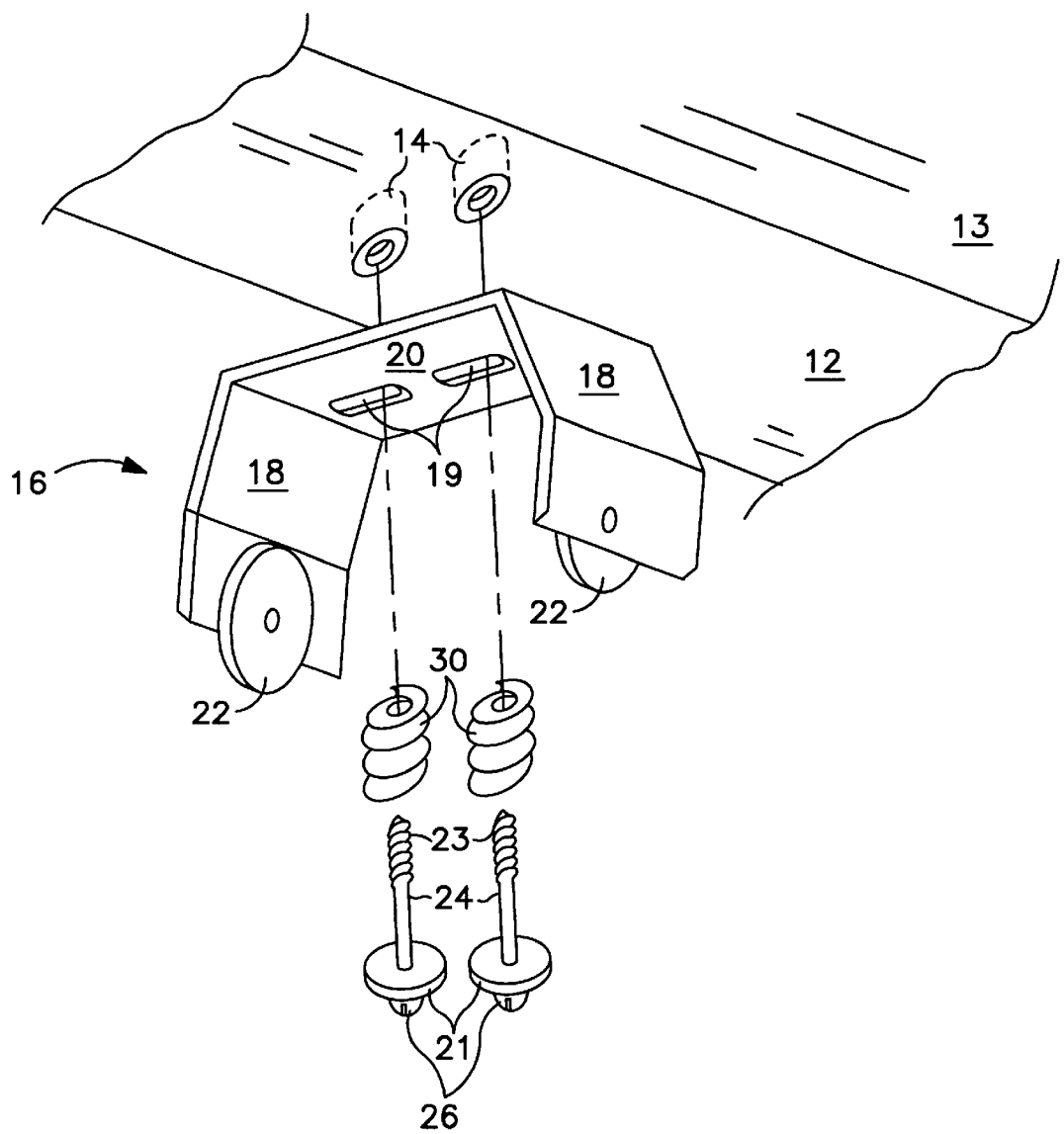
FIG. 2 shows an exploded view of FIG. 1.

Turning now to a description of the drawings, FIG. 1 shows an assembly view and FIG. 2 shows an exploded view of the landing gear of this invention. There are shown the bottom side 12 of the model plane 13 (cutaway) having a pair of blind nuts 14 imbedded in the bottom surface of the plane. Model airplanes typically have these blind nuts for attaching state of the art landing gear.

There is shown a yoke 16 including two flat leg members 18 connected by a union section 20. Each leg 18 has an upper end joined to a respective end of the union section 20. Each leg 18 has a respective wheel 22 rotatably mounted on a lower end. The threaded ends 23 of a pair of bolts 24 extend through respective slots 19 in the union section 20 and screw into blind nuts 14 imbedded in the body of the airplane. A washer 21 has one surface positioned against the head 26 of the bolt 24 and has the opposite surface pressed against the end of a coil spring 30 mounted on the bolt 24 between the washer 21 and union section 20. Each washer 21 is preferably rubberized and dimensioned to align the upper end of the spring 30 with the bolt 24. The springs are partially compressed between the union section 20 and the washer 21 against the head 26 of the bolt 24.

Figure 3:
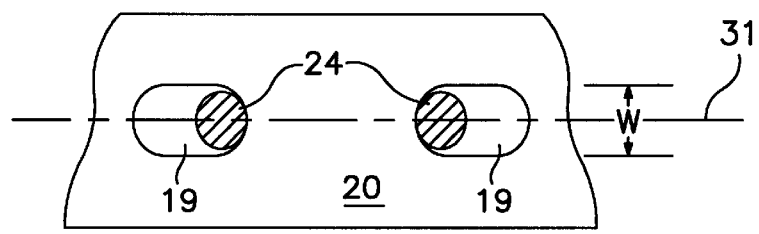
FIG. 3 shows the positioning and dimensioning of the slotted apertures relative to the bolts.

FIG. 3 is a sectional view of the bolts 24 positioned in the slots 19 in the union section 20. An important feature of the invention are the dimensions of the slots 19 and their position relative to one another in the union section 20. The slots 19 are aligned end to end with one another and each bolt 24 passes through an end of the slot 19 closest to the other slot 19. This arrangement permits the landing gear 10 to tilt about an axis 21 parallel to the direction of travel.

The width, w. of each slot 19 is selected to be sufficiently large to permit the union section 20 of the landing gear 10 to tilt (rotate) about the common centerline 31 of the slots. Yet the width of the slot must not be larger than is necessary to permit the maximum tilt in order to maintain in-line support of the spring against the union section 20.

Figure 4:
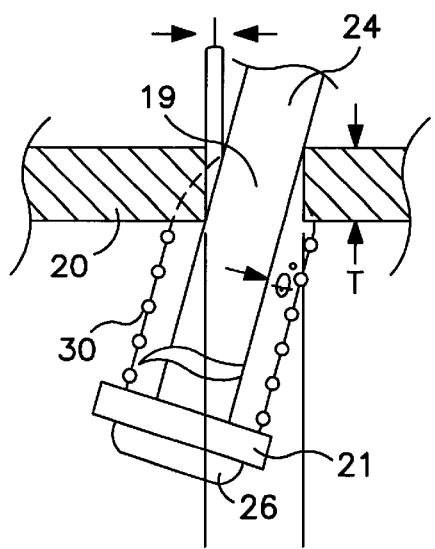
FIG. 4 shows selection of the slot width.

FIG. 4 shows that the clearance, 2d, between the bolt 24 and the width of the slot 19 is $$2d \sin \phi$$

where $\phi$ is the maximum allowable angle of tilt of the face of the union section 20 with respect to the surface of the airplane. Typically, the thickness, T, of the union section is about 0.060", the diameter of the bolt is 0.187", maximum acceptable forward/rearward tilt is 15° so that the width of the slot is typically:

$$0.188" + 2 \times 0.060 \times (\sin 15°) = 0.218"$$

Figure 5:
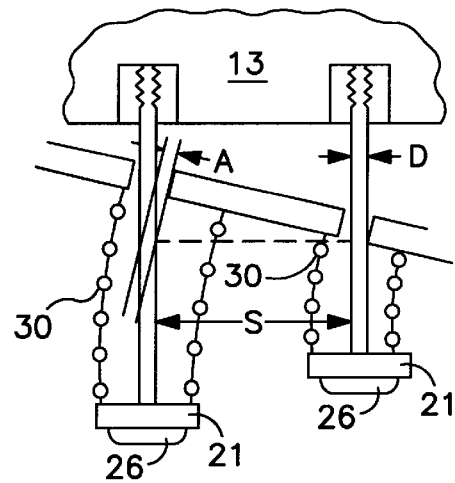
FIG. 5 shows selection of the slot length.

FIG. 5 is a sectional view of the union section tilted sideways with the two bolts 24 screwed into the body of the plane. In order to permit maximum sideways tilt, (typically about 15°), the length of each slot 19 must be at least (as illustrated in FIG. 5)

$$(S/\cos \phi) - S + D$$

FIGS. 4 and 5 also show the flexure (bending of the spring axes which restore the union section to its equilibrium position after is encounter with the irregularities in the terrain.

FIG. 1 also shows an embodiment in which a sheet of resilient sponge rubber 17 is interposed between the bottom surface of the plane and the top surface of the union section.

Figure 6:
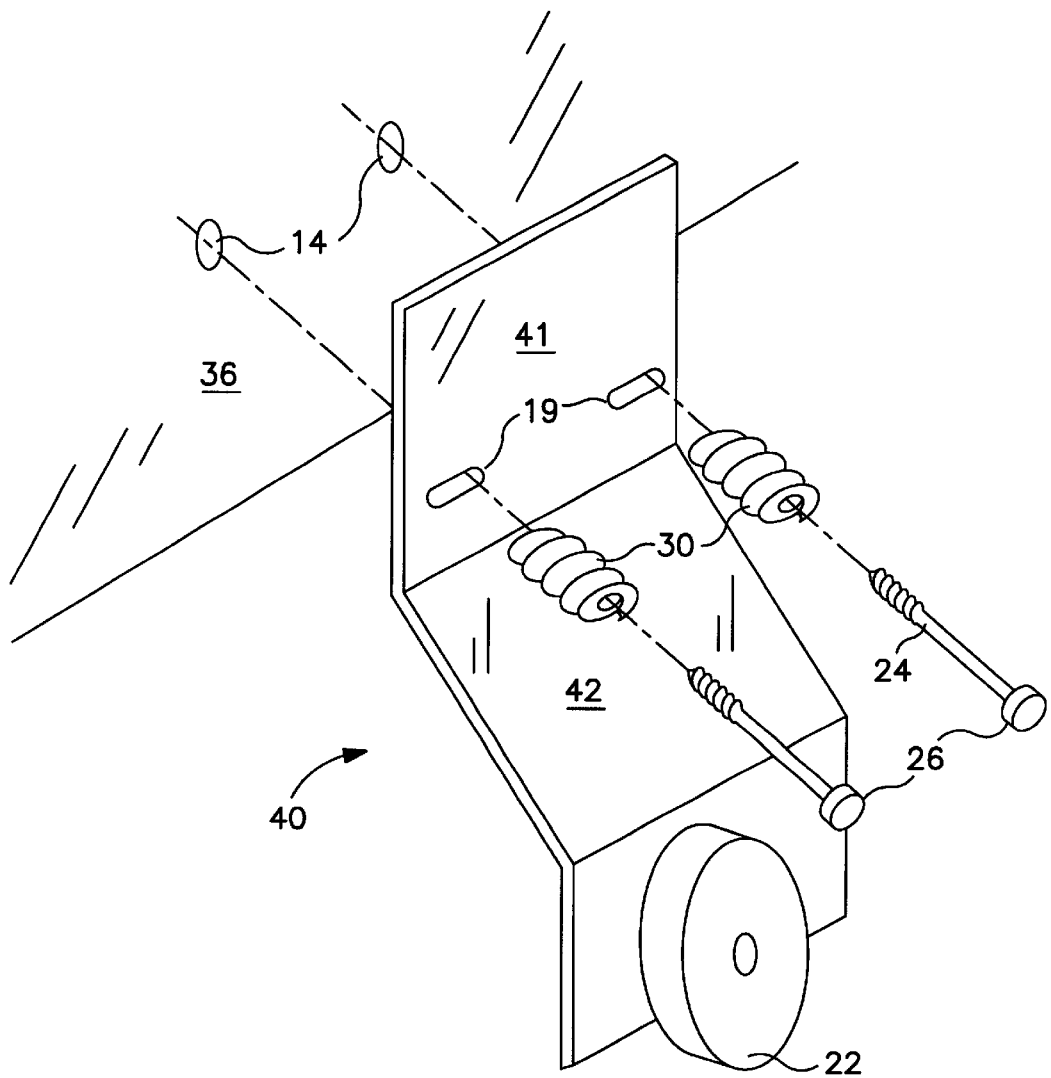
FIG. 6 shows another embodiment for supporting a single wheel.

FIG. 6 shows another embodiment in which the invention is adapted to support a single wheel 22 against a surface 36 that is a vertical surface of the plane body at either end of the airplane. In this embodiment, the wheel 22 is supported on one end of an angle 40 comprising two legs 41, 42. Each leg is joined obliquely to the other leg at one end. One leg 42 has a wheel 22 rotatably mounted on an opposite end. The other leg has a pair of slotted apertures 19 aligned end to end and is suitably bent to interface with the surface 36 of the airplane where it is resiliently secured by a pair of bolts 24. Each bolt 24 passes through respective slots 19 in the leg and is screwed into a blind nut 14 imbedded in the airplane wing or body. A pair of coil springs 30 is captured at the other end of each bolt 24 by the head 26 of the bolt 24 and the exposed surface of the leg 41.

There has been described a landing gear that solves a vexing problem for hobbyists, namely a landing gear that resists damage due to a rough landing that occurs when the plane is landing on rough terrain. The landing gear of this invention is very price competitive compared to other attempts to solve the problem and is conveniently mounted on existing aircraft. Novelty in the invention resides in the mounting of a shock absorbing spring outside the body of the plane in a manner wherein the axis of the spring is enabled to bend allowing the landing gear to tilt in response to spurious torques that are generated by encounters with irregularities in the terrain.

Variations and modifications may be contemplated after reading the specifications and studying the drawings that are within the scope of the invention. For example, the yoke is made of a material selectable from any one of a plastic and metal, especially aluminum.

I therefore wish to define the scope of my invention by the appended claims.

I claim:

1. A landing gear for a model airplane comprising:

a wheel;

a pair of legs, each leg having one end obliquely joined along a straight bend line to said one end of said other leg;

one of said legs having another end adapted for rotatably supporting said wheel;

another one of said legs having a flat surface for interfacing a flat surface of a part of said airplane and with a pair of slot apertures in said flat surface of said another leg;

said slot apertures being slots oriented end to end;

a pair of bolts, one of said pair of bolts for one of said slot apertures and another one of said pair of bolts for another slot aperture of said pair of slot apertures;

each bolt having a threaded end extending through a respective one of said pair of slot apertures and adapted for screwing into a respective one of a pair of blind nuts fixed in said airplane proximal to said flat surface;

each bolt of said pair of bolts having another end with a bolt head and extending away from said another leg and said flat surface of said plane;

a pair of coil springs, each one of said pair of coil springs mounted on a respective one of said pair of bolts, compressed between said respective head and a surface of said another leg facing away from said plane;

said end of said another leg being a straight edge parallel to said bend line and parallel to a center line passing through said apertures aligned end to end;

each one of said pair of bolts having a diameter, each said slot aperture being a slot with a length and width, and spaced from one another, all operably arranged and selected to permit said another leg to tilt about an axis parallel to said bend line and said edge up to a selected allowable angle.

2. The landing gear of claim 1 wherein the surface of said air plane is a vertical surface of a body of said airplane.

3. The landing gear of claim 1 wherein the surface of said plane is a horizontal surface of a wing of said airplane.

4. A landing gear for a model airplane comprising:

a yoke having two legs and a flat union section having a face wherein an end of each leg is joined to one end of said union section opposite an end of said other leg joined to an opposite end of said union section;

said face being a face of said union section facing away from said legs;

a pair of bolts, each bolt having a threaded end extending through a respective slot aperture in said union section and adapted for screwing into a respective one of a pair of blind nuts imbedded in said plane when said face of said union section abuts a surface of said airplane;

said blind nuts separated from one another by a distance;

each said slotted aperture being a slot with a length and a width;

said slotted apertures arranged end to end with a distance between closest ends of said slotted apertures equal to said distance between said imbedded nuts;

each bolt having a head on an end of said bolt extending away from said union section and said surface of said plane;

a pair of coil springs, each coil spring mounted on one of said bolts, respectively, and compressibly retained between said bolt head and a surface of said union section facing away from said plane and arranged to bias said face of said union section against said surface of said airplane;

each coil spring having an inner diameter selected to enable an axis of said spring to bend whereby said union section is enabled to tilt to a selected maximum angle relative to said surface of said airplane, adjacent said union section;

said selected maximum angle being $\phi$, said length of each slotted aperture L, a separation of said blind bolts being S, a diameter of said bolt being D, and the length of the slotted aperture being at least L, where $$L=D+S-S/\cos\phi;$$

said width of each slotted aperture being w, a thickness of said union section is W, and the width of said slotted aperture is about $$W=D+2W\sin\phi.$$

5. The landing gear of claim 4 wherein said selected maximum angle is about 20°.

6. The landing gear of claim 4 comprising a resilient pad interposed at said interface between said surface of said airplane and said union section.

7. The landing gear of claim 6 wherein said resilient pad comprises a resilient foam.

8. The landing gear of claim 4 wherein said support means is metal.

9. The landing gear of claim 4 wherein said support means is plastic.

* * * * *